United States Patent
Kirkpatrick et al.

(10) Patent No.: US 7,000,236 B2
(45) Date of Patent: Feb. 14, 2006

(54) SYSTEM AND METHOD FOR USING WEB BASED APPLICATIONS TO MANIPULATE DATA WITH MANIPULATION FUNCTIONS

(75) Inventors: Mark A. Kirkpatrick, Conyers, GA (US); Michael S. Bass, Lawrenceville, GA (US); Darin J. Morrow, Acworth, GA (US); John A. Strohmeyer, Norcross, GA (US); Mauricio Lopez, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 785 days.

(21) Appl. No.: 09/995,647

(22) Filed: Nov. 29, 2001

(65) Prior Publication Data

US 2005/0015717 A1    Jan. 20, 2005

Related U.S. Application Data

(63) Continuation-in-part of application No. 09/916,288, filed on Jul. 30, 2001.

(51) Int. Cl.
*G06F 9/00*    (2006.01)

(52) U.S. Cl. ............................ 719/316; 707/7; 707/101
(58) Field of Classification Search .................. 707/10, 707/100, 101, 7; 719/316; 709/201, 218, 709/227

See application file for complete search history.

(56) References Cited

U.S. PATENT DOCUMENTS

| | | | |
|---|---|---|---|
| 6,226,637 B1 * | 5/2001 | Carey et al. ................... 707/4 |
| 6,513,038 B1 * | 1/2003 | Hasegawa et al. ............ 707/7 |
| 6,665,662 B1 * | 12/2003 | Kirkwood et al. ............ 707/3 |
| 6,816,864 B1 * | 11/2004 | Deuser et al. ............. 707/100 |

\* cited by examiner

*Primary Examiner*—W. Thomson
*Assistant Examiner*—Li Zhen
(74) *Attorney, Agent, or Firm*—Walters & Zimmerman; Jennifer Medin; Todd Mitchem

(57) ABSTRACT

Web based clients using embodiments of the disclosed invention may efficiently access stored manipulation functions in order to perform manipulation functions on data via Internet applications. The disclosed system allows web based applications to receive manipulation services on data using dynamically maintained, centrally stored, manipulation functions.

23 Claims, 3 Drawing Sheets

SYSTEM AND METHOD FOR USING WEB BASED APPLICATIONS TO MANIPULATE DATA WITH MANIPULATION FUNCTIONS

This application is a continuation-in-part of U.S. patent application Ser. No. 09/916,288, filed Jul. 30, 2001, which is hereby incorporated by reference herein in its entirety.

FIELD OF THE INVENTION

The present invention relates to an improved system and method for web based applications to perform manipulation functions on data. More particularly, the present invention relates to a system and a method for allowing web users to execute hierarchical configurable data manipulation functions on data.

BACKGROUND OF THE INVENTION

Computer applications ("application servers") commonly require data to be manipulated prior to additional processing. Manipulation requirements are often dynamic. For example, manipulation requirements for a telephone service provider's software applications may change based on changed customer service availability, newly available or no longer available customer services, the number of customer requests in a given period, the acceptable times for requests, or the version of the software running.

In today's networked environment, application servers run a variety of different software protocols (e.g., J2EE Containers with CORBA orbs, J2EE Containers with RMI) and typically require a number of different data manipulations before performing other functions. As a result, a need exists for an application server that can dynamically maintain, process and efficiently run manipulations for a plurality of clients running different software protocols simultaneously.

Further, because manipulation needs often change, a need exists for a manipulation application server that can manipulate the manipulations run on specific fields of client manipulation requests without requiring extensive changes in software. Most computer software applications use configuration variables to alter their behavior without the need for regenerating code. This is most often done using text files. In today's Internet and networked environments this can cause administrative problems. This is largely because one software application may be running on several machines, in several locations. Thus, in order to alter the behavior of all of the copies of the software applications installed on all of the machines (i.e., in order to uniformly alter the behavior of all clients), the text files must access several files, often in several locations. This can be expensive and create significant administration problems. For one thing, security considerations often dictate that a text file employed to alter a software application must be on the same machine that is running the code. Therefore, the configuration file often must be replicated over several machines. If changes are made on one software application, they must also be made on all of the other applications. Errors can occur if the changes are not made consistently on all of the applications. Accordingly, a further need exists for an application server that will allow application server administrators to update the various manipulations done on fields of data without a new release of code.

Typically, in a web environment (including Internet, Intranet and Extranet applications), there are client-side applications and server-side applications. Accordingly, in a web-based environment, a further need exists for an improved system and method of performing manipulations on data submitted by web users with client-side applications.

SUMMARY OF THE INVENTION

The present invention is a system and method wherein an application server or web server using standard software protocols may access a centralized, maintainable, manipulation application server and/or a data schema in order to perform manipulation services on data. Client servers may access a manipulation server via a number of methods including Internet applications, a Java RMI server, a CORBA gateway server and graphical screen interphase applications. In other embodiments, web users may use stored manipulation functions via a web server and Java Server pages. The disclosed invention allows for the efficient performance of manipulation services on data based on dynamically-maintained, centrally-stored, manipulation functions, and preferably returns manipulation notifications to the client servers.

Embodiments of the invention for a web environment allow web users using web browsers to request data manipulation services via web servers using client side methods such as Java and JavaScript code. A web user can access manipulation rules stored in data schema using one or more Java Server Pages with Java code embedded in those pages. In the preferred embodiment of this architecture, at least one JSP containing Java files will be compiled at a first instance that they are executed.

DETAILED DESCRIPTION OF THE INVENTION

Figure 1:
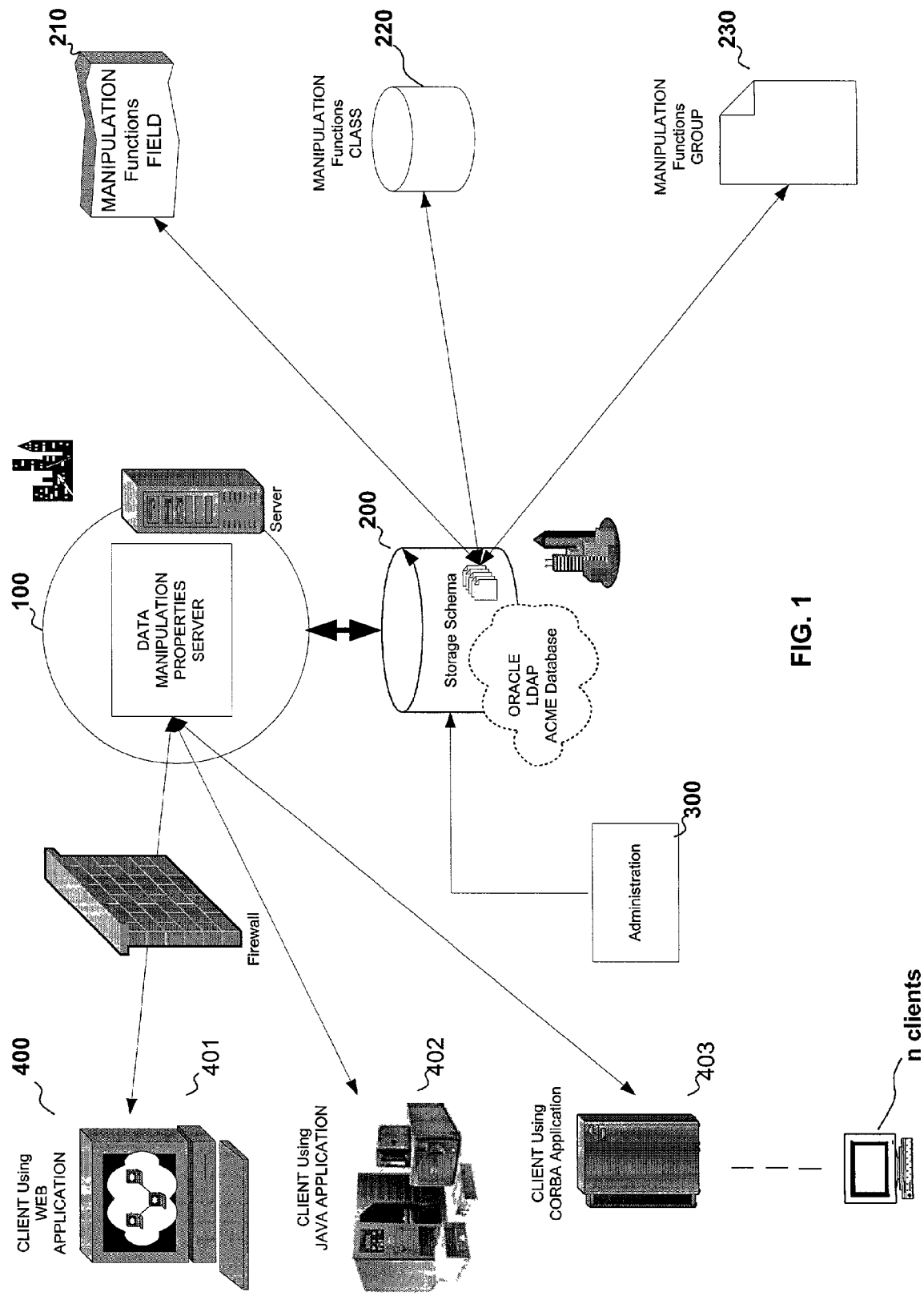
FIG. 1 is a schematic diagram of an overview of an embodiment of the present invention.

As shown in FIG. 1, for those embodiments directed at server-side applications, the present invention preferably includes an application properties server 100 for receiving manipulation requests from clients 400 and a storage mass 200 for storing centralized manipulation functions and data. As will be appreciated by those skilled in the art, manipulation properties application server 100 may be represented by one or more servers, even if located in different geographic locations. In the preferred embodiment of the present invention, depending on system resources, a number n of clients 400 may access the manipulation application server 100 for manipulation service via a number of methods including, for example, clients 401 using Internet applications, clients 402 using Java via a Java RMI server (not shown), clients 403 using CORBA via a CORBA gateway server (not shown), and clients using graphical screen interphase applications.

Figure 2:
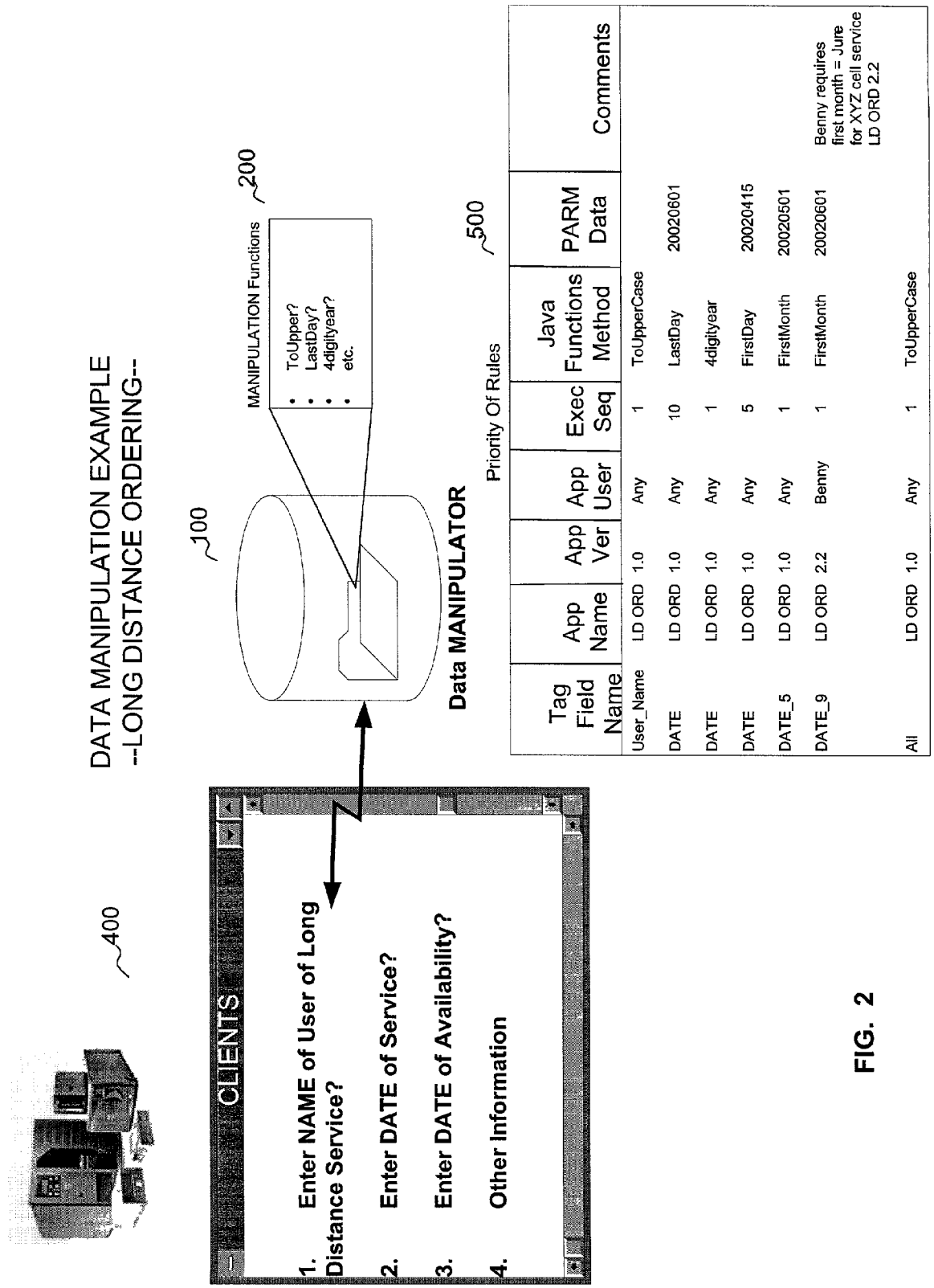
FIG. 2 is a schematic diagram illustrating a specific embodiment of the present invention.

Referring to FIG. 1, according to an embodiment of the present invention, clients serve validation requests to the application server 100 which then accesses storage mass 200 using a hierarchical rule-based system 500 (FIG. 2). The validation application server 100 identifies and accesses the stored data and performs validation services associated with the validation requests. Preferably tables of validation functions, or rules, implement the validation data, which may preferably be stored in a storage mass such as an ORACLE® database. As described below, by utilizing a table-based storage system, the application server of the present invention can efficiently and dynamically perform validation services on validation requests provided by a number n of clients.

Referring to FIG. 1, client 401 requests manipulated services related to data for long distance ordering information including, e.g., valid installation dates, available installation dates, and the allowable number of telephones. Storage mass 200 contains a plurality of data tables 210, 220, 230, . . . that will be described below. In response to client 401's manipulation requests, manipulation properties server 100 provides manipulation services to client 401 by accessing storage mass 200. Similarly, and possibly simultaneously, a client 402 running a Java application program can use RMI via an RMI interface to interact with properties server 100 and provide services including the manipulation of data based on information stored in storage mass 200. Finally, a third client, running a CORBA application 403 may also request manipulation service on data related to, for example, Wireless Ordering. Again, manipulation properties server 100 accesses storage mass 200 and performs a manipulation service for client 403.

The validation data may be stored in a format such as ORACLE® or Lightweight Directory Access Protocol ("LDAP"). The information may be stored in another location or may be shared with other businesses. Preferably, validation data is stored in a table based system, more preferably in an ORACLE® database 200. As will be appreciated by those skilled in the art, use of an ORACLE® database allows for good performance, data integrity, and a wide variety of data management tools to administer the configuration data via an administration system 300. As will also be appreciated by those skilled in the art, ORACLE® database 200 may be represented by two or more databases located in separate geographical locations.

FIG. 2 depicts a more specific embodiment and example of the present invention as it relates to server-side applications. Database 200 consists of a table-based system of rules organized into three hierarchically organized views: FIELD, CLASS and GLOBAL. The three views allow hierarchical management of the manipulation(s) to be performed on data fields received from the client server 400. In the preferred embodiment, the three views are FIELD, CLASS and GLOBAL in order of precedence. Of course, the number of views may vary depending on the client's needs. Other embodiments of the present invention include four or more views.

In this embodiment, each of the FIELD, CLASS and GLOBAL views has an execution sequence. Utilizing an execution sequence provides a layered approach, and thereby a hierarchical approach to performing manipulation requests, and yields efficient results in this embodiment. According to the execution sequence for a particular view, several manipulation methods can be orderly executed on data for a matching field.

Before providing a specific example, the FIELD, CLASS and GLOBAL views are explained below. In the preferred embodiment, the FIELD view is the highest priority manipulation. Preferably, the least amount of data is sorted by the FIELD view. If a FIELD name for the associated application is in this table that entry will dictate the manipulations to be performed.

As an example of one embodiment of the present invention, referring to Table 1, the FIELD view contains the following data:

TABLE 1

| Column Name | Description |
| --- | --- |
| Tag Name | Name of data field used to locate manipulations |
| Application Name | Application tag to differentiate field names from those in other applications. |

TABLE 1-continued

| Column Name | Description |
| --- | --- |
| Application Version | Application tag to differentiate field names from those in other versions of the same application. |
| Application User | Application tag to differentiate field names from those in other instances of an application and version for different users. |
| Execution Sequence | A number designating the order of execution for the 1 or more manipulation methods for an item meeting the previous criteria. |
| Manipulation Method | The name of an existing Java method to be called with the value of the field to be manipulated. |
| Manipulation Values ("PARM Data") | Used by the manipulation method to compare to the data value. Presence determined by manipulation method. Items are separated by a predefined character (generally a ",") (e.g., 1,5; 20020901, 20020601) |
| Comment | Description of desired rule. Used for documentation only. |

In the preferred embodiment, the CLASS view is the second-highest priority manipulation. The CLASS view is used if there is no matching entry in the FIELD view. In such a case, the server 100 will perform a lookup on the passed field name. For example, the server 100 will perform a lookup on the passed field name. The manipulation server 100 will check for class names that match the first part of the field name. An illustrative example is discussed below to describe the FIELD view and CLASS view hierarchy.

EXAMPLE 1

No Address_1.Data

A client application server 400 accesses the manipulation application server 100 with data tagged with the field name of Address_1. However, there is no Address_1 item in the FIELD view. There is, however, an entry in the CLASS view for Address. Therefore the manipulation functions for the CLASS view Address will be performed on the data in Address_1.

As an example of one embodiment of the present invention, referring to Table 2, the CLASS view contains the following data:

TABLE 2

| Column Name | Description |
| --- | --- |
| Tag Name | A generic string that will be used to match the field's name up to a defined character. (Date_1 will match up with Date) |
| Application Name | Application tag to differentiate field names from those in other applications. |
| Application Version | Application tag to differentiate field names from those in other versions of the same application. |
| Application User | Application tag to differentiate field names from those in other instances of an application and version for different users. |
| Execution Sequence | A number designating the order of execution for the 1 or more manipulation methods for an item meeting the previous criteria. |

TABLE 2-continued

| Column Name | Description |
| --- | --- |
| Manipulation Method | The name of an existing Java method to be called with the value of the field to be manipulated. |
| Manipulation Value 1 ("PARM Data") | Used by the manipulation method to compare to the data value. Presence are separated by a predefined character (generally a ",") |
| Comment | Description of desired rule. Used for documentation only. |

Finally, in the preferred embodiment, the GLOBAL view is the most generic method of performing manipulation functions. Any field that does not have an entry in either the FIELD or CLASS view will be manipulated with the methods dictated for the associated application information. As this view is generic, preferably the most data is handled at the GLOBAL level, thereby improving efficiency. Examples are now discussed below describing the hierarchy between the FIELD, CLASS and GLOBAL views.

EXAMPLE 2

The Field Name is Residence_2

There is no Residence_2 item in the FIELD view. There is no Residence entry in the CLASS view. There is, however, a GLOBAL manipulation function called toUpper in the GLOBAL table for the application 400 (name, version and user) that requires data manipulation. Therefore, in this example, the data for Residence_2 will be converted to all uppercase letters and manipulation properties server 100 will provide an appropriate return to client 400.

In the preferred embodiment, each of the FIELD, CLASS and GLOBAL views has an execution sequence for the associated manipulation functions that exist for that view. This provides a layered approach to manipulation. An example for describing the execution sequence is described below.

EXAMPLE 3

Field Name: DATE_1

Referring to the illustrative table below, in this illustrative example there is no match for Field Name: Date_1 in the FIELD view. However, there are manipulation executions in the FIELD view table for LastDay, 4digitYear and FirstDay. The manipulation properties server 100 recognizes that the CLASS view table has a matching item called Date. An example of the CLASS view table is as follows:

| Tag Name | Application Name | Application Version | Application User | Execution Sequence | Manipulation Method | Manipulation Value 1 | Comment |
| --- | --- | --- | --- | --- | --- | --- | --- |
| Date | Appl1 | 001 | EMRS1 | 10 | LastDay | Dec. 31, 2002 | |
| Date | Appl1 | 001 | EMRS1 | 1 | 4digitYear | | |
| Date | Appl1 | 001 | EMRS1 | 5 | FirstDay | Jan. 01, 1996 | |

In this exemplary example, based on the Execution Sequence of "1", the date is first converted to a four-digit year (if necessary by manipulation method "4digityear"). Next, based on the next rule, which has an execution sequence of "5", the date data will be converted to Jan. 1, 1996 if it is not prior to that date using the FirstDay method. Next, the date will be converted to Dec. 31, 2002 if it is after that date with the LastDay method based on the Manipulation Value 1 PARM data in the CLASS view table. Finally, the server 100 will return the converted data to the requesting client application server 400. As will be appreciated, this is an example illustrating a "CLASS" level manipulation.

The table below illustrates examples of proposed manipulation functions:

| Return Type | Function Name | Argument 1 | Argument 2 | Argument 3 | Argument 4 |
| --- | --- | --- | --- | --- | --- |
| Boolean | ManipulateIntegerField | String Field Name | Integer Field Data | Integer Min Value | Integer Max Value |
| Boolean | ManipulateString Field | String Field Name | String Field Data | | Integer Max Value |
| Boolean | ManipulateDateRange Field | String Field Name | String Field Data | Earliest Date | Latest Date |

FIG. 2 depicts further example manipulations performed by an exemplary embodiment of the present invention. In this embodiment, client application server Long Distance Delivery Ordering ("LD ORD") 400 seeks to manipulate data input by a customer, such as user name, the type of service requested, the date available for service, the date of expiration related to a desired telephone service, etc. Accordingly, using a known software application protocol, application server LD ORD 400 sends manipulation requests related to the data input by a customer to the manipulation application server 100. As a first example, the user's name is tag named "User_Name" and has been input as "John Doe". The server 100 notes that the application LD ORD, version 1.0, has generated a request for service. Accordingly, the manipulation application server 100 generates an instruction to call the FIELD view table from the storage medium 200 for User_Name. In this example, the application server 100 automatically follows the priority of rules stored and dynamically maintained in the database 500. Here, there is only one rule, i.e., one Java Function, for User_Name, which is applicable to any user of LD ORD, version 1.0. As shown in FIG. 2, the Java method associated with User_Name rule is ToUpperCase method. Accordingly, the manipulation server 100 checks to see if the input data is all uppercase while also checking for PARM data. Here, if the input data is not all uppercase, the manipulation server 100 converts the data to all uppercase for client 400 and provides an appropriate return to client 400. Of course, if the input data is all uppercase the manipulation server 100 returns an appropriate response to client 400.

Next, according to the example depicted in FIG. 2, the manipulation server 100 performs manipulation service on manipulation requests for data input by a user for date of service, which has been tagged DATE_Serv. Here, database 200 presently has no FIELD view rules for any users of LD ORD, version 1.0, data tagged DATE_Serv. However, in the preferred embodiment, the manipulation server 100 will automatically perform two of three available Java-based CLASS view functions, based on the PARM data and execution sequence of the three presently available CLASS view rules, on the data tagged DATE_Serv, thereby converting the input data 4/01/02 to 20020415. First, the server performs a 4digityear function, and then the server performs a FirstDay function. In this example, the function LastDay is not performed because the PARM data is past the input date. Here again, server 100 provides an appropriate response to client 400. As shown in FIG. 2, the application server 100 will read the execution sequences to determine which Java function to perform first. Java function 4digityear has an execution sequence of "1" and Java function FirstDay has an execution sequence of "5". Based on this sequence of execution set forth in this CLASS view, the manipulation server 100 executes first the 4digityear function and then the FirstDay function on the data. As will be appreciated by those skilled in the art, in this example, if there were no DATE rules, manipulation application server 100 would automatically look for GLOBAL rules in the GLOBAL-view table. Of course, in other embodiments, the server 100 could prompt the user for additional information or generate prompts between class levels. In other embodiments, further services may be provided in response to manipulated data being returned to the client, such as additional data manipulations, generation of further functions, etc. In one embodiment, the manipulated data is displayed on a user's screen for approval before further processing.

Referring again to FIG. 2, next, LD ORD 400 requests manipulation service on data related to the date of availability for a requested telephone service. This data has been tagged DATE_5. The priority of rules 500 indicates that presently there is one rule in the FIELD view, i.e., there is one manipulation function, for DATE_5. Therefore, the manipulation application server 100 performs a FirstMonth function on the data tagged DATE 5.

As shown in FIG. 2, in some instances, server 100 will have rules for specific users of specific versions of application LD ORD. Additionally, database 200 may contain various GLOBAL methods (e.g., ALL) data used by any user of LD ORD. As will be appreciated, the server 100 provides great flexibility for dynamically providing many manipulation functions for a plurality of clients.

As will also be appreciated, by utilizing a centrally located storage system of dynamically maintainable manipulation rules, the present invention provides greater flexibility than known systems. For example, in the exemplary example discussed above system administration 300 (FIG. 1) can change the PARM data for DATE_5 and, accordingly, all applications 400 requesting manipulation services for data related to DATE_5 are contemporaneously updated.

In some instances, the number of manipulation requests may be large depending on the number n of application clients 400 using the server 100. Constant database 200 reads may cause delays in manipulation service. Therefore, in one exemplary embodiment, the manipulation server 100 will read the database 200 data 500 into memory on startup. Updates to the manipulation rules and values stored in the data tables can occur after system start up.

Two exemplary methods to handle dynamic table updates are described below. The first method is to restart the manipulation application server 100 each night during a maintenance window. This approach is a simple restart of the manipulation server. The application itself would not have to restart since it could detect the lost connection to the manipulation server and reconnect. This would be seamless to the applications and end user of the applications. Another exemplary method involves creating a refresh function in the manipulation server 100. Preferably the server 100 will use a REFRESH_HOURS parameter. The memory tables will be updated from the database 200 based on this parameter. Preferably, the REFRESH_HOURS will be greater than 8. As will be appreciated, keeping the data 500 in the application server 100 memory will improve manipulation performance and allow or maintaining the dynamic nature of the manipulation routines.

The most generic field type in Java is the string. In the preferred embodiment, all data passed to the manipulation server 100 will be treated as a string. This will allow applications 400 to change to more generic data without impact. This embodiment will provide an interface that is generic as possible by establishing the interface as Strings (ASCII). An example of this concept is set forth below.

For example, originally a business requirement required a date value for a Date of Birth variable. The requirement for the legacy system required the date with a two-digit year. The value of the field data from the data source is "02/31/2002." However, testing with the legacy system shows that the legacy system actually needs a four-digit year. Because the application is using the manipulator server 100, a code change is avoided. Since the integer values can be type cast to String and passed to the manipulation server 100, modifications to the rules can be made quickly. Modifications to types would cause the manipulation server 100 to understand application knowledge and not data values and manipulation rules. Here, the manipulation method can be changed from 2digityear to 4digityear. Accordingly, the output dates will now have the correct format for the legacy application.

According to the present invention, since the variable is stored as a string, the client code is not affected. Changes to manipulation functions may be done without disturbing the running applications that utilize this manipulation service.

Proposed ManipulatorClient CLASS methods include:

TABLE 3

| Method | Return Type | Arguments | Description |
| --- | --- | --- | --- |
| ManipulatorClient | ManipulatorClient | Application Name, Application Version, Application User | Class constructor. Also used to initialize Application data for subsequent calls |
| ManipulatorClient | ManipulatorClient | | Class constructor. |
| ManipulatorClient | ManipulatorClient | | Class destructor |
| set | | Application Name, Application Version, Application User | Sets application data settings for the object. |
| translate | Boolean | Field Name, Field Value | Sends data to the manipulator server for work. If the data is successfully translated, a TRUE is returned. Otherwise; a FALSE is returned. |
| translate | MRHashTable | FMHashTable | Sends data to the manipulator server for work. If the data is successfully translated, a TRUE is returned. Otherwise; a FALSE is returned. |
| RuleType | Integer | Field Name | Gets the rule type used for manipulation - 0 = None, 1 = Field, 2 = Class, 3 = Global {Used primarily for development} |

In one embodiment, the client servers 400 can minimize network traffic using Field Value Hashtables. As will be appreciated, this will reduce the number of transactions to the manipulation application server 100 and improve performance. One call to the server 100 can contain an entire set of data in need of manipulation. The individual manipulation statuses will also be returned in a Hashtable. Preferably, the IsValid method is used to determine if all the data passed manipulation. If not, individual methods can be checked to determine problem areas.

Proposed FMHashTable CLASS methods include:

TABLE 4

| Method | Return Type | Arguments | Description |
| --- | --- | --- | --- |
| FMHashTable | FMHashTable | | Constructor for a Field Value Hash Table object. |

TABLE 4-continued

| Method | Return Type | Arguments | Description |
| --- | --- | --- | --- |
| AddToSet | Boolean | Field Name, Field Value | Add a field value pair to the FVHashTable. Return True on success. |
| RemoveFromSet | Boolean | Field Name | Remove a field value pair from the FVHashTable. Return True on success. |
| MemberValue | String | Field Name | Return the value of the specified key. |

Proposed MRHashTable CLASS methods:

TABLE 5

| Method | Return Type | Arguments | Description |
| --- | --- | --- | --- |
| MRHashTable | MRHashTable | | Constructor for a Manipulator Return HashTable object. |
| AddToSet | Boolean | String Field Name, Boolean Valid | Add a field value pair to the MRHashTable. Return True on success. |
| RemoveFromSet | Boolean | String Field Name, | Remove a field value pair from the MRHashTable. Return True on success. |
| MemberValue | Boolean | Field Name | Return the manipulation status value of the specified key. |

TABLE 5-continued

| Method | Return Type | Arguments | Description |
|---|---|---|---|
| IsValid | Boolean | | Returns a True if all values for the set are True. Otherwise; returns a False. |

Figure 3A:
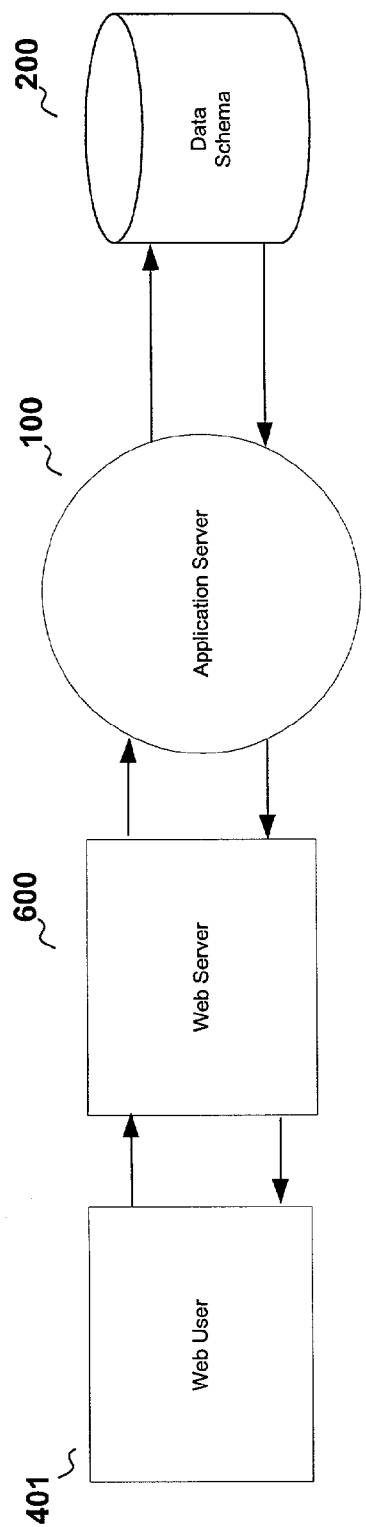
FIGS. 3A and 3B are diagrams illustrating embodiments of the present invention that include web server applications.
Figure 3B:
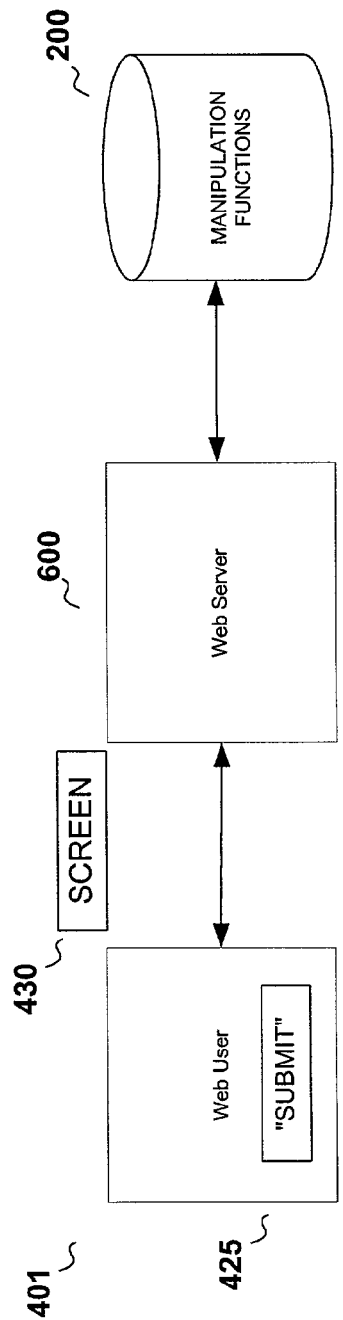

Referring to FIGS. 3A and 3B, further exemplary embodiments related to web-based applications of embodiments of the present invention will now be described. As shown in FIG. 3A, a web user 401 may access data schema 200 via application server 100 by using the exmplerary methods discussed above. Alternatively, in a web environment, as shown in FIG. 3B, web user(s) (i.e., web applications) 401 using web browsers may request data manipulation services via web server(s) 600 using client side methods such as Java and JavaScript code. As will be explained below, web user 401 can access manipulation rules stored in data schema 200 using one or more Java Server Pages ("JSP") with Java code embedded in those pages.

In the preferred embodiment of this architecture, at least one JSP containing Java files will be compiled into class files at the first instance that they are executed. Referring to FIG. 3B, web user 401 calls a JSP and web server 600 reads manipulation information from data schema 200 to understand the manipulation behavior that it should run in the application. Java methods are used to load manipulation rules into objects that can be used by the JSP. Web server 600 puts the appropriate code in place, using, for example, known Java methods such as the "init" function. Accordingly, data manipulation rules are configured in the memory of a running program and Java files are converted into class files when they are called by web server 600. In particular, the submit function 425 of the form will go through a Java method to perform the necessary JavaScript functions. These functions will be included into the JSP from a common library of JavaScript manipulation functions. As will be appreciated, the JSP will reflect the most recent manipulation behavior dictated by the manipulation rules in the data schema 200. This behavior will direct the JavaScript functions and order of execution for each data field using similar manipulation hierarchy architecture as that explained above. The JSP code will have calls to Java servlet methods. These Java servlet methods are compiled into byte code class files when the web server is started.

According to one embodiment, the first method called will be getManipulationSet(String ApplicationName, String ApplicationVersion, String ApplicationUser). This method will retrieve the matching records for this application from the database 200 and store them in memory in an array. This will keep the information from the database 200 in local memory as long as the web server 600 keeps the JSP compiled. Therefore, it will not be necessary to go to the database 200 each time this server page is accessed. Web servers normally recompile JSP code when they are restarted. However, they sometimes reload them when they see that the source has been modified. They also recompile them when the class file is deleted.

Preferably, the data from the web form will be modified when the user signals that screen entry is complete. This is typically done by the user clicking a "submit" button 425. The submit button is an event button on the web browser screen 430 that indicates the user is finished entering data into the web form. This event will signal the JSP code that the data has been entered and is ready for manipulation.

The typical Java method used will be doManipulation (String tag, String currentValue, String newValue). This method will look in the local array to find rules that apply to the given tag. These rules are determined in a hierarchical manner as described above. The data passed in the currentValue variable will be modified according to those rules. Preferably, the updated value will be returned in the newValue variable. This is all done in local code. No further calls to the manipulation server database 200 are required. In the preferred embodiment, this will be done for each field specified by the code in the JSP.

Alternatively, it is also possible to do this manipulation(s) while data is being entered in the data form. This will require JavaScript code in the JSP. JavaScript provides methods to web forms, making them more interactive. Limited intelligence can be provided by the Java running in the browser. The form does not have to be pushed to the web server for form processing. This is typically done with on Update calls that trigger each time data in a field changes. This event could call the doManipulation method if the JSP chooses.

These embodiments offer improved performance for operating in a web-based environment. For example, using this architecture requires fewer accesses to data schema 200. As described above, manipulation functions will be stored inside the memory of the running program. Accordingly, when web user 401 executes a program, the manipulation functions are already in memory. The required manipulation behavior will be dictated on the initial compilation load of the class.

As will be appreciated by those skilled in the art(s), a screen in HTML format contains the contents of a web browser's display buffer. This could include one or more frames. Any frame can contain a form. A form is a data entry form that captures user data input. If the web page contains JavaScript, data manipulations and other functions can be done locally. Of course, the form processing may be done by the web server 600 on a submit event.

As will be appreciated by those skilled in the art, changes in the manipulation rules will not be implemented until a JSP is recompiled. This event can be triggered by a number of methods. For example, a web administrator can initiate recompiling and reloading by deleting class files. Class files may be deleted so that the web server 600 senses the need to recompile. Accordingly, changes can be made in the manipulation rules compiled in the web application. Subsequently, the web server's 600 manipulation behavior may be altered the next time the server 600 compiles the Java pages and reads information from the data schema 200.

As will be appreciated, according to the embodiments discussed above, two devices that are coupled can engage in direct communications, in indirect communications or a combination thereof. Embodiments of the present invention relate to data communications via one or more networks. The data communications can be carried by one or more communications channels of the one or more networks. Examples of a network include a Wide Area Network (WAN), a Local Area Network (LAN), the Internet, a wireless network, a wired network, a connection-oriented network, a packet network, an Internet Protocol (IP) network, or a combination thereof. A network can include wired communication links (e.g., coaxial cable, copper wires, optical fibers, and so on), wireless communication links (e.g., satellite communication links, terrestrial wireless communication links, wireless LANs, and so on), or a combination thereof.

In accordance with an embodiment of the present invention, instructions adapted to be executed by a processor to perform a method are stored on a computer-readable medium. The computer-readable medium can be a device that stores digital information. For example, a computer-readable medium includes a hard disk, a floppy disk, a tape and a compact disc read-only memory (CD-ROM), all as known in the art for storing software. The computer-readable medium is accessed by a processor suitable for executing instructions adapted to be executed. The term "adapted to be executed" is meant to encompass any instructions that are ready to be executed in their present form (e.g., machine code) by a processor, or require further manipulation (e.g., compilation, decryption, or provided with an access code, etc.) to be ready to be executed by a processor.

In describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, unless that order is explicitly described as required by the description of the process in the specification. Otherwise, one skilled in the art can readily appreciate that the sequences may be varied and still remain within the spirit and scope of the present invention.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A computer system for use with web-based applications comprising:
   a web browser application;
   at least one web form running on the web browser;
   a web server capable of processing web-based forms;
   a database stored in memory, the memory coupled to said computer system, wherein said web server is used for manipulating data with rules compiled in said web browser from said database; and
   files containing manipulation rules in said database, the manipulation rules comprising at least three hierarchically organized views, with each view utilizing an execution sequence of manipulation functions;
   wherein the data is manipulated according to a highest priority view; and
   if the data to be manipulated does not contain an entry matching the highest priority view, then the data is manipulated according to a second-highest priority view; and
   if the data to be manipulated does not contain an entry matching the second-highest priority view, then the data is manipulated according to generic functions.

2. A computer system according to claim 1, wherein the manipulation rules are organized as a table-based system.

3. A computer system according to claim 1, wherein the highest priority view contains data describing a name of the highest priority view and an application name, the application name differentiating field names from those in other applications.

4. A computer system according to claim 1, wherein said manipulation rules manipulate long distance ordering functions.

5. A computer system according to claim 4, wherein said manipulation rules are represented in the form of Lightweight Directory Access Protocol.

6. A computer system according to claim 1, wherein the second-highest priority view contains data describing a generic string that is used to match a name of the highest priority view to a defined character.

7. A computer system according to claim 1, wherein the highest priority view has the execution sequence of first converting date data to a four-digit year, then converting the date data to Jan. 1, 1996 if not prior to that date, then converting the date data to Dec. 31, 2002 if after that date.

8. A computer system according to claim 1, wherein said database is represented by Lightweight Directory Access Protocol.

9. A web server system comprising:
   a plurality of web browser applications;
   means for performing manipulation service on data submitted by said at least one of the web browser applications;
   means for processing web forms;
   means for storing and retrieving a plurality of manipulation rules for performing said manipulation service, the manipulation rules comprising at least three hierarchically organized views, with each view utilizing an execution sequence of manipulation functions; and
   means for comprising manipulation rules into said at least one web application in order to perform said manipulation service;
   wherein the data is manipulated according to a highest priority view;
   if the data to be manipulated does not contain an entry matching the highest priority view, then the data is manipulated according to a second-highest priority view; and
   if the data to be manipulated does not contain an entry matching the second-highest priority view, then the data is manipulated according to generic functions.

10. A web server system according to claim 9, comprising means for initiating a recompiling of said at least one web application.

11. A web server system according to claim 9, wherein said manipulation rules are stored in the form of Lightweight Directory Access Protocol.

12. A web server system according to claim 9, wherein said manipulation rules manipulate long distance ordering.

13. A web server system according to claim 9, wherein the highest priority view has the execution sequence of first converting date data to a four-digit year, then converting the date data to Jan. 1, 1996 if not prior to that date, then converting the date data to Dec. 31, 2002 if after that date.

14. A web server system according to claim 9, wherein the second-highest priority view contains data describing a generic string that is used to match a name of the highest priority view to a defined character.

15. A computer-readable medium comprising instructions for performing the steps:

calling at least one server page from a web application;
compiling said at least one server page at a web server;
retrieving stored manipulation rules from centralized storage coupled to said web server, the manipulation rules comprising at least three hierarchically organized views, with each view utilizing an execution sequence of manipulation functions; and
manipulating data provided from said web application in accordance with said manipulation rules;
wherein the manipulation rules manipulate data according to a highest priority view;
if the data to be manipulated does not contain an entry matching the highest priority view, then manipulating the data according to a second-highest priority view; and
if the data to be manipulated does not contain an entry matching the second-highest priority view, then manipulating the data according to generic functions.

16. A computer implemented method of providing manipulation data service with a web-based computer system comprising the steps of:
calling at least one server page from a web application;
compiling said at least one server page at a web server;
retrieving stored manipulation rules from centralized storage coupled to said web server, the manipulation rules comprising at least three hierarchically organized views, with each view utilizing an execution sequence of manipulation functions; and
manipulating data provided from said web application in accordance with said manipulation rules;
wherein the manipulation rules manipulate data according to a highest priority view;
if the data to be manipulated does not contain an entry matching the highest priority view, then manipulating the data according to a second-highest priority view; and
if the data to be manipulated does not contain an entry matching the second-highest priority view, then manipulating the data according to generic functions.

17. A method according to claim 16, wherein said manipulation rules manipulate long distance ordering.

18. A method according to claim 16, wherein the highest priority view has the execution sequence of first converting date data to a four-digit year, then converting the date data to Jan. 1, 1996 if not prior to that date, then converting the date data to Dec. 31, 2002 if after that date.

19. A method according to claim 16, wherein the second-highest priority view contains data describing a generic string that is used to match a name of the highest priority view to a defined character.

20. A method according to claim 16, wherein said manipulation rules manipulate long distance ordering information having a highest priority view representing valid installation dates, a second-highest priority view representing available installation dates, and a generic view representing an allowable number of telephones.

21. A method according to claim 16, wherein retrieving the stored manipulation rules comprises retrieving the manipulation rules in the form of an Lightweight Directory Access Protocol.

22. A computer implemented method for validating data with a web server system, the method comprising:
a step for sending a data manipulation service request from a web user;
a step for generating a manipulation service instruction, the service instruction based at least in part on the manipulation service request from said web user;
a step for compiling a server page into class files;
a step for reading manipulation rules from a database, the manipulation rules comprising at least three hierarchically organized views, with each view utilizing an execution sequence of manipulation functions;
a step for configuring the data manipulation information in the memory of a running program;
a step for executing a manipulation function in accordance with the manipulation rules;
wherein the manipulation rules manipulate data according to a highest priority view;
if the data to be manipulated does not contain an entry matching the highest priority view, then manipulating the data according to a second-highest priority view; and
if the data to be manipulated does not contain an entry matching the second-highest priority view, then manipulating the data according to generic functions.

23. A method according to claim 22, wherein the highest priority view has the execution sequence of first converting date data to a four-digit year, then converting the date data to Jan. 1, 1996 if not prior to that date, then converting the date data to Dec. 31, 2002 if after that date.

* * * * *